R. E. POINDEXTER.
Saw.
No. 204,369. Patented May 28, 1878.
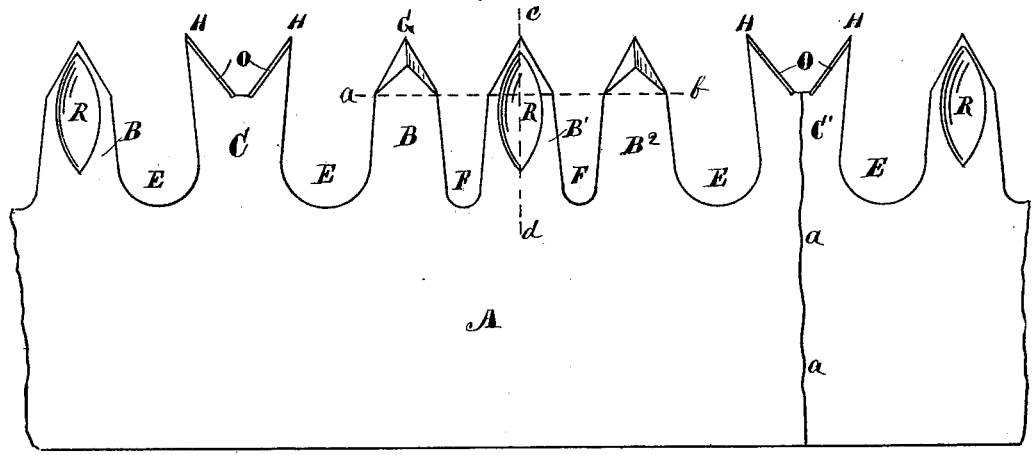
Fig. 1.
Fig. 2.
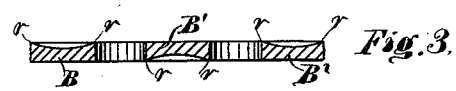
Fig. 3.
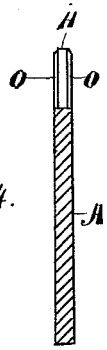
Fig. 4.
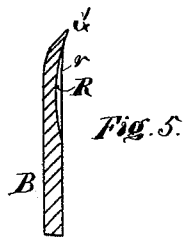
Fig. 6.
Fig. 5.
Witnesses:
S. C. Frink
H. A. Moore
Inventor.
Robert E. Poindexter
Per E. C. Frink,
his Attorney.

UNITED STATES PATENT OFFICE.

ROBERT E. POINDEXTER, OF ANDERSON, INDIANA.

IMPROVEMENT IN SAWS.

Specification forming part of Letters Patent No. 204,369, dated May 28, 1878; application filed January 28, 1878.

*To all whom it may concern:*

Be it known that I, ROBERT E. POINDEXTER, of Anderson, in the county of Madison and State of Indiana, have invented certain new and useful Improvements in the Construction of Crosscut-Saws, which are fully set forth and described in the following specification, and illustrated in the accompanying drawing.

The invention relates to improvements in the construction of crosscut-saws, which heretofore have employed various forms of cutting and clearing teeth and chip-chambers for the purpose of severing the fibers of the timber and removing the dust and chips from the kerf. Among the various devices for this purpose are the improvements patented by J. H. Smith and E. G. Peckham, No. 95,052; David Sattler, No. 121,007; Wm. H. Bently, No. 149,562, and E. M. Boynton, No. 175,330, of which I am aware, and to the inventions therein set forth I make no claim.

The object of my invention is to make a crosscut-saw with triple teeth for cutting the sides of the kerf between the clearing or raking teeth, that remove the ridge at the end of the kerf, and to provide ample chip-chambers between all of the teeth that shall be of equal depth, and at the same time not have the clearing-teeth so far apart as to allow the saw to jump or wabble in the timber while being operated; also, to construct the cutting-teeth and clearing-teeth so that they will each do their own respective work, and thus allow the saw to run steadily and cut rapidly in all kinds of timber.

The invention consists of the new construction and arrangement of the cutting-teeth and chip-chambers and of the clearing or chisel teeth, which are deemed essential in the construction of a crosscut-saw in order to produce certain results, all of which will be hereinafter fully described and set forth.

In the accompanying drawing, in which like letters of reference indicate like parts, Figure 1 is a section of a saw embodying my improvements. Fig. 2 is an edge view of the same. Fig. 3 is a cross-section, taken at the line $c\,d$, of Fig. 1. Fig. 4 is an enlarged vertical section of Fig. 1 at the line $a\,a$. Fig. 5 is a vertical section of Fig. 1 at the line $c\,d$. Fig. 6 is a perspective view of the clearing or chisel teeth.

A represents the saw-blade, which is provided with three triangular or diamond-pointed cutting-teeth, B B$^1$ B$^2$, between the clearing or chisel teeth C C'. The said cutting-teeth are formed wide at the base, and taper upward to the base of the triangular point G, thus giving great strength to the teeth, and facilitating the filing thereof, and permitting a chip-chamber, F, between them, that extends to the extreme base of the teeth, said chip-chamber being wide at the top between the points of the teeth and narrow at the bottom, as shown. The cutting-teeth B are hammered on the cutting-edge sides, in such a manner as to form the concaves R, which draws the points G toward their proper set, and tends to hold them there, and also produces the curved edges $r\,r$ at the cutting-edges of the teeth, which, when filed, present well-defined, keen, sharp edges, that are less liable to be rounded off by wear than those teeth which are not provided with the concaves.

The clearing or chisel teeth C are of the construction shown, which is somewhat similar in general appearance to others which are designed to rake out the ridge left by the cutting-teeth at the bottom of the kerf, but are essentially different in construction and arrangement for the particular purposes designed to be accomplished by them. The said chisel-teeth are widest at the top, where they are provided with two chisels or cutters, H H, and are narrow at their bases, as shown.

It will be observed that, in order to produce chip-chambers E of the required size at the sides of the chisel-teeth to receive and carry out of the kerf the chips raked off by the chisels H H, and at the same time keep the said teeth as close together as possible and admit of three cutting-teeth, B, between them, with chip-chambers F of sufficient capacity to carry out the dust and chips received therein, the large chambers E are partially cut from the base of the chisel-tooth on each side, thus reducing the width of the clearing-tooth at the base.

The edges of the teeth C and B in the chamber E are parallel to each other, and inclined at an angle corresponding with the edge of the teeth B.

By this construction and arrangement of teeth and chip-chambers the saw will be made to run freely, cut smooth, and not wabble or jump in the timber while being operated, and requires less power to operate it than in saws where the clearing or chisel teeth are wide apart, with large spaces between them and the cutting-teeth, and small chip-chambers between the cutting-teeth.

The clearing-teeth C have two chisel-pointed cutters, H H, as shown, which are square at the top and chamfered on the corners O, in contradistinction to rounded cutters or ranters. The object of chamfering the upper edges O of the chisels H is to prevent the extreme corners of the points H from being worn off, and to allow the points G of the cutting-teeth B to do their own work of cutting the sides of the kerf, while the chisels H only rake out the ridge left at the end of the kerf; otherwise the chisels H would produce a jumping of the saw, and would be scraping the extreme corners of the bottom of the kerf, and prevent, in a measure, the cutting-teeth from having their proper feed.

What I claim is—

1. A saw provided with three diamond-pointed tapering cutting-teeth, B $B^1$ $B^2$, between two clearing-teeth, C C', each diamond-pointed tooth having a concave, R, on the cutting side, in the manner substantially as and for the purpose shown.

2. A saw-tooth, B, having a concave, R, on the cutting side, so as to draw the point G toward its proper set, and to form the curved cutting-edges $r$ $r$, in the manner and for the purpose substantially as shown and described.

In testimony whereof I have signed my name to this specification in the presence of two subscribing witnesses.

ROBERT E. POINDEXTER.

Witnesses:
E. O. FRINK,
MILES L. DAVIS.